(12) United States Patent
Nakata et al.

(10) Patent No.: US 12,223,609 B2
(45) Date of Patent: Feb. 11, 2025

(54) INFORMATION PROCESSING DEVICE, INFORMATION PROCESSING SYSTEM, AND PROGRAM

(71) Applicants: SONY GROUP CORPORATION, Tokyo (JP); SONY INTERACTIVE ENTERTAINMENT INC., Tokyo (JP)

(72) Inventors: Masashi Nakata, Tokyo (JP); Takashi Imamura, Tokyo (JP); Mihee Kang, Tokyo (JP); Masatoshi Fukuda, Tokyo (JP); Yoshio Konno, Tokyo (JP); Junichi Tanaka, Tokyo (JP); Takuma Domae, Tokyo (JP)

(73) Assignees: SONY GROUP CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 173 days.

(21) Appl. No.: 17/922,224

(22) PCT Filed: Apr. 28, 2021

(86) PCT No.: PCT/JP2021/016927
§ 371 (c)(1),
(2) Date: Oct. 28, 2022

(87) PCT Pub. No.: WO2021/225099
PCT Pub. Date: Nov. 11, 2021

(65) Prior Publication Data
US 2023/0177787 A1 Jun. 8, 2023

(30) Foreign Application Priority Data
May 7, 2020 (JP) .................................. 2020-082137

(51) Int. Cl.
*G06T 19/20* (2011.01)
*G06F 21/10* (2013.01)
(Continued)

(52) U.S. Cl.
CPC .............. *G06T 19/20* (2013.01); *G06F 21/10* (2013.01); *G06Q 20/1235* (2013.01);
(Continued)

(58) Field of Classification Search
None
See application file for complete search history.

(56) References Cited

U.S. PATENT DOCUMENTS 7,770,109 B2 * 8/2010 Fortes .................... G06Q 30/02
715/209
11,170,006 B2 * 11/2021 Sernau .................. G06F 16/906
(Continued)

FOREIGN PATENT DOCUMENTS

JP     2002-342673 A    11/2002
JP     2014-174912 A    9/2014
(Continued)

*Primary Examiner* — Saptarshi Mazumder
(74) *Attorney, Agent, or Firm* — Paratus Law Group, PLLC

(57) ABSTRACT

A right holder information checking unit (55) (checking unit) of a content checking device (12) (information processing device) checks whether content (45) posted by a poster (40) to a virtual space in which one or more pieces of content can be shared has right holder information indicating that the content is appropriate content permitted to be posted by the right holder of the content (45).

18 Claims, 11 Drawing Sheets

(51) Int. Cl.
    *G06Q 20/12*     (2012.01)
    *G06V 40/20*     (2022.01)

(52) U.S. Cl.
    CPC ...... *G06V 40/20* (2022.01); *G06F 2221/2141* (2013.01); *G06T 2219/2004* (2013.01)

(56) References Cited

U.S. PATENT DOCUMENTS

| | | | |
|---|---|---|---|
| 11,395,021 B2 * | 7/2022 | Chundi | ............. H04N 21/2407 |
| 2005/0251694 A1 * | 11/2005 | Ueda | ....................... G06F 21/10 |
| | | | 713/193 |
| 2014/0278873 A1 | 9/2014 | Shimizu et al. | |
| 2017/0270625 A1 | 9/2017 | Kereth et al. | |
| 2018/0077440 A1 * | 3/2018 | Wadhera | ............ H04N 21/8456 |

FOREIGN PATENT DOCUMENTS

| | | | |
|---|---|---|---|
| JP | 2014-216001 A | 11/2014 | |
| JP | 2017-142578 A | 8/2017 | |
| JP | 2019-509577 A | 4/2019 | |
| JP | 2019-213649 A | 12/2019 | |
| WO | WO-0102985 A2 * | 1/2001 | ............. G06Q 30/06 |

\* cited by examiner

INFORMATION PROCESSING DEVICE, INFORMATION PROCESSING SYSTEM, AND PROGRAM

CROSS REFERENCE TO PRIOR APPLICATION

This application is a National Stage Patent Application of PCT International Patent Application No. PCT/JP2021/016927 (filed on Apr. 28, 2021) under 35 U.S.C. § 371, which claims priority to Japanese Patent Application No. 2020-082137 (filed on May 7, 2020), which are all hereby incorporated by reference in their entirety.

FIELD

The present disclosure relates to an information processing device, an information processing system, and a program.

BACKGROUND

A method for realizing a virtual exhibition in which a viewer can freely view exhibits arranged (exhibited) in a virtual space is conventionally known.

CITATION LIST

Patent Literature

Patent Literature 1: JP 2002-342673 A

SUMMARY

Technical Problem

As disclosed in Patent Literature 1, the concept of arranging pieces of content in a virtual space is publicly known, but a means for allowing a user to appropriately handle the arranged pieces of content (a posting means, a viewing means, a rating means, or the like) has not been provided.

The present disclosure proposes an information processing device, an information processing system, and a program that allow a user to appropriately handle pieces of content arranged in a virtual space.

Solution to Problem

To solve the problems described above, an information processing device according to an embodiment of the present disclosure includes a checking unit that checks information on content posted by a poster in a virtual space in which one or more pieces of content can be shared, wherein the checking unit checks whether the posted content has right holder information.

DESCRIPTION OF EMBODIMENTS

Figure 1:
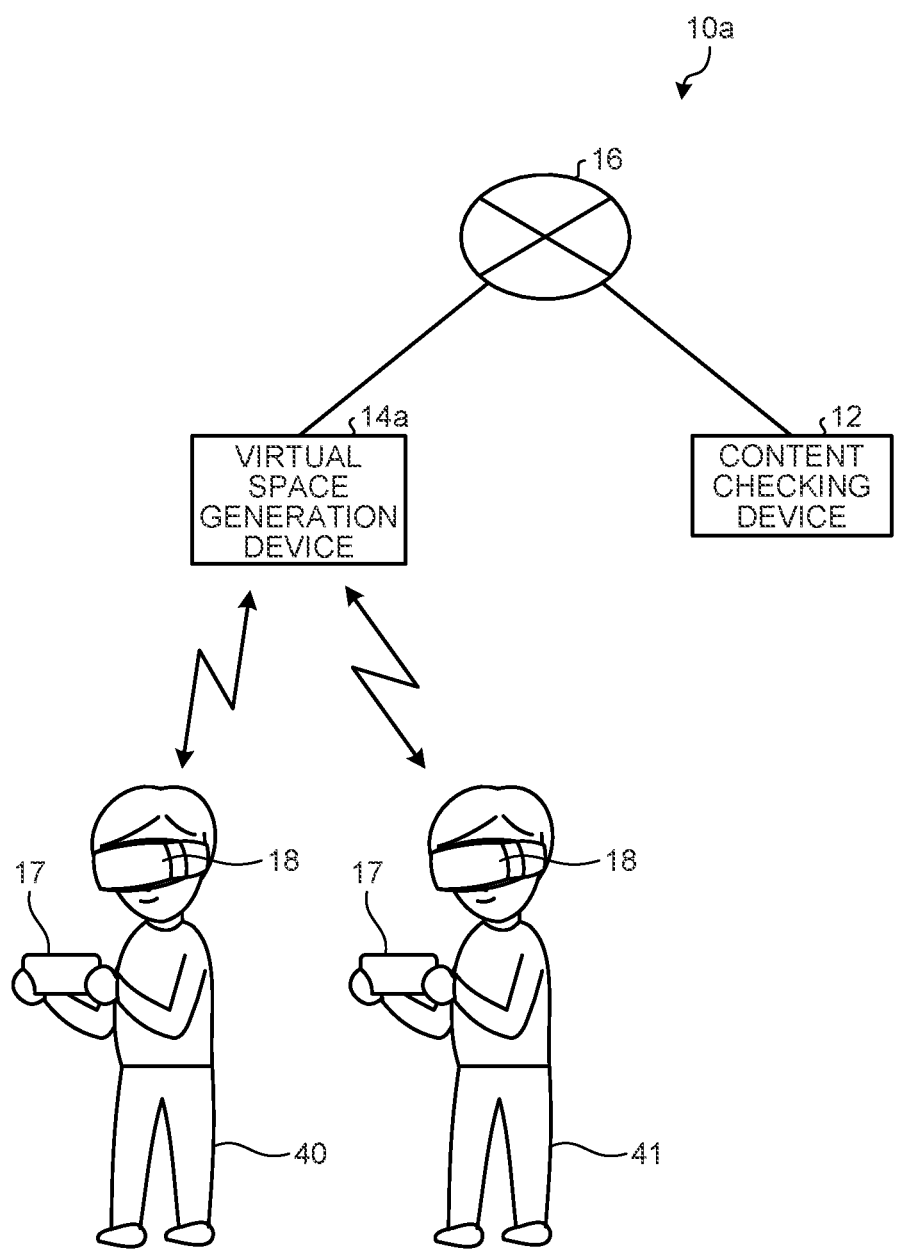
FIG. 1 is a system block diagram illustrating an example of a general configuration of a virtual exhibition system according to a first embodiment.

In the following, embodiments of the present disclosure will be described in detail with reference to the drawings. In each of the following embodiments, identical parts are denoted by the same reference numeral to omit repeated description.

In addition, the present disclosure will be described in the following order of items.

1. First Embodiment
1-1. System Configuration of Virtual Exhibition System
1-2. Hardware Configuration of Virtual Exhibition System
1-3. Functional Configuration of Content Checking Device
1-4. Functional Configuration of Virtual Space Generation Device
1-5. Flow of Process Performed by Virtual Exhibition System (When Content Is Posted)
1-6. Flow of Process Performed by Virtual Exhibition System (When Content is Viewed)
1-7. Effects of First Embodiment
2. Second Embodiment
2-1. Functional Configuration of Virtual Space Generation Device of Second Embodiment
2-2. Retention Parameter and Replacement Parameter of Content
2-3. Effects of Second Embodiment
3. Third Embodiment
3-1. System Configuration of Virtual Exhibition System of Third Embodiment
3-2. Effects of Third Embodiment

1. First Embodiment

[1-1. System Configuration of Virtual Exhibition System]

First, an outline of a virtual exhibition system $10a$ to which the present disclosure is applied will be given with reference to FIG. 1. FIG. 1 is a system block diagram illustrating an example of a general configuration of the virtual exhibition system according to a first embodiment.

As illustrated in FIG. 1, the virtual exhibition system 10*a* has a configuration in which a content checking device 12 and a virtual space generation device 14*a* are connected by a network 16 such as the Internet.

Furthermore, the virtual exhibition system 10*a* includes a controller 17 and a head mounted display (HMD) 18. A poster 40 who posts content 45 to an exhibition hall 44 generated in the virtual space by the virtual space generation device 14*a*, and a viewer 41 who views the posted content 45 each have the controller 17 and the head mounted display (HMD) 18. The exhibition hall 44 can be simultaneously viewed by a plurality of viewers 41. That is, one or more pieces of content can be shared in the virtual space. Note that the virtual exhibition system 10*a* is an example of an information processing system of the present disclosure. The exhibition hall 44 is also an example of the virtual space of the present disclosure.

In the present embodiment, as an example, the operation of the virtual exhibition system 10*a* when an operating company 43 that supports activities of an artist holds a live show of the artist will be described. A spectator attending the live show of the artist films a live video using his/her portable terminal such as a smartphone or a tablet terminal, a camera, a video camera, or the like. Then, the spectator posts the live video edited by himself/herself to the virtual exhibition system 10*a* as the content 45.

Note that it is assumed that there is an arrangement between the operating company 43 and a right holder 42 who owns the copyright of the artist that permits the spectators to post live videos they have acquired to the exhibition hall 44 formed in the virtual space.

Then, the viewer 41 who has entered the exhibition hall 44 formed in the virtual space can freely view the posted content 45 such as the live videos by moving around in the virtual space.

The virtual space generation device 14*a* illustrated in FIG. 1 permits a user registered in advance to post and view the content 45. In addition, the virtual space generation device 14*a* arranges the posted pieces of content 45 in the virtual space based on relevance, similarity, or the like. Furthermore, the virtual space generation device 14*a* acquires a rating of the viewer 41 for each piece of content 45. The virtual space generation device 14*a* is an example of the information processing device of the present disclosure.

The viewer 41 operates the controller 17 to freely move around in the exhibition hall 44 and find content 45 the viewer likes. The controller 17 may be a dedicated operation device having a joystick, a direction selection button, or the like, or may be a portable terminal carried by the viewer 41. In the case where a portable terminal is used as the controller 17, a dedicated application downloaded in advance is used. When the viewer 41 finds content 45 that interests him/her, the viewer 41 views an image or video, or listens to music with the HMD 18.

The content checking device 12 is managed by the operating company 43 that supports the activities of the artist, and determines whether the content 45 posted to the virtual space generation device 14*a* is content that can be posted. Video, image, or audio master data of the live show, which has been provided by the right holder 42, is registered in the content checking device 12. The right holder 42 may either be a person related to the operating company 43 or a person not related to the operating company 43.

The master data registered in the content checking device 12 is used when determining whether or not the content 45 posted to the virtual space generation device 14*a* is information that is permitted to be posted. In addition, the content checking device 12 calculates an information usage fee (copyright fee) to be paid to the right holder 42 of the content 45 on condition that the posted content 45 is determined to be content that can be posted. Note that the content checking device 12 is an example of the information processing device in the present disclosure.

Figure 2:
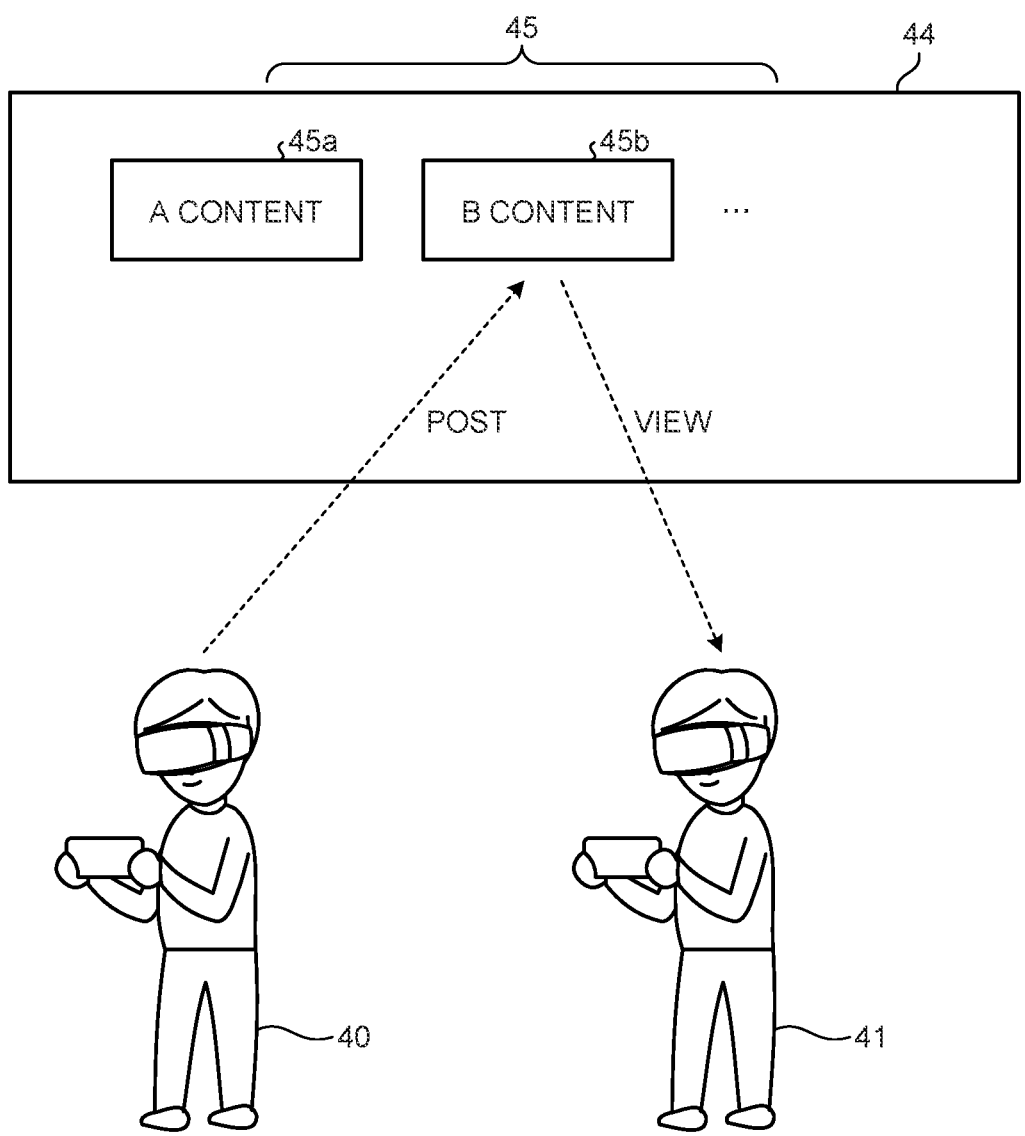
FIG. 2 is a diagram illustrating an example of an exhibition hall generated by the virtual exhibition system.

FIG. 2 is a diagram illustrating an example of the exhibition hall generated by the virtual exhibition system. A plurality of pieces of content 45 (A content 45*a*, B content 45*b*, . . . ) are exhibited in the exhibition hall 44 generated in the virtual space by the virtual space generation device 14*a*.

For example, the B content 45*b* is content posted by the poster 40. The viewer 41 freely moves around in the exhibition hall 44 by operating the controller 17. When the viewer 41 finds content 45 that he/she likes, the viewer 41 views that content 45 with the HMD 18 he/she is wearing.

When the viewer 41 views a piece of content 45, the viewer 41 rates that piece of content 45. A piece of content 45 that has been highly rated by a plurality of viewers 41 is moved to an arrangement position at which it attracts more attention. On the other hand, a piece of content 45 that is not highly rated is moved to an arrangement position at which the content attracts less attention. As described above, the virtual space generation device 14*a* maintains the freshness of the exhibited pieces of content 45 by sequentially updating their arrangement positions according to the ratings of the pieces of content 45.

[1-2. Hardware Configuration of Virtual Exhibition System]

Figure 3:
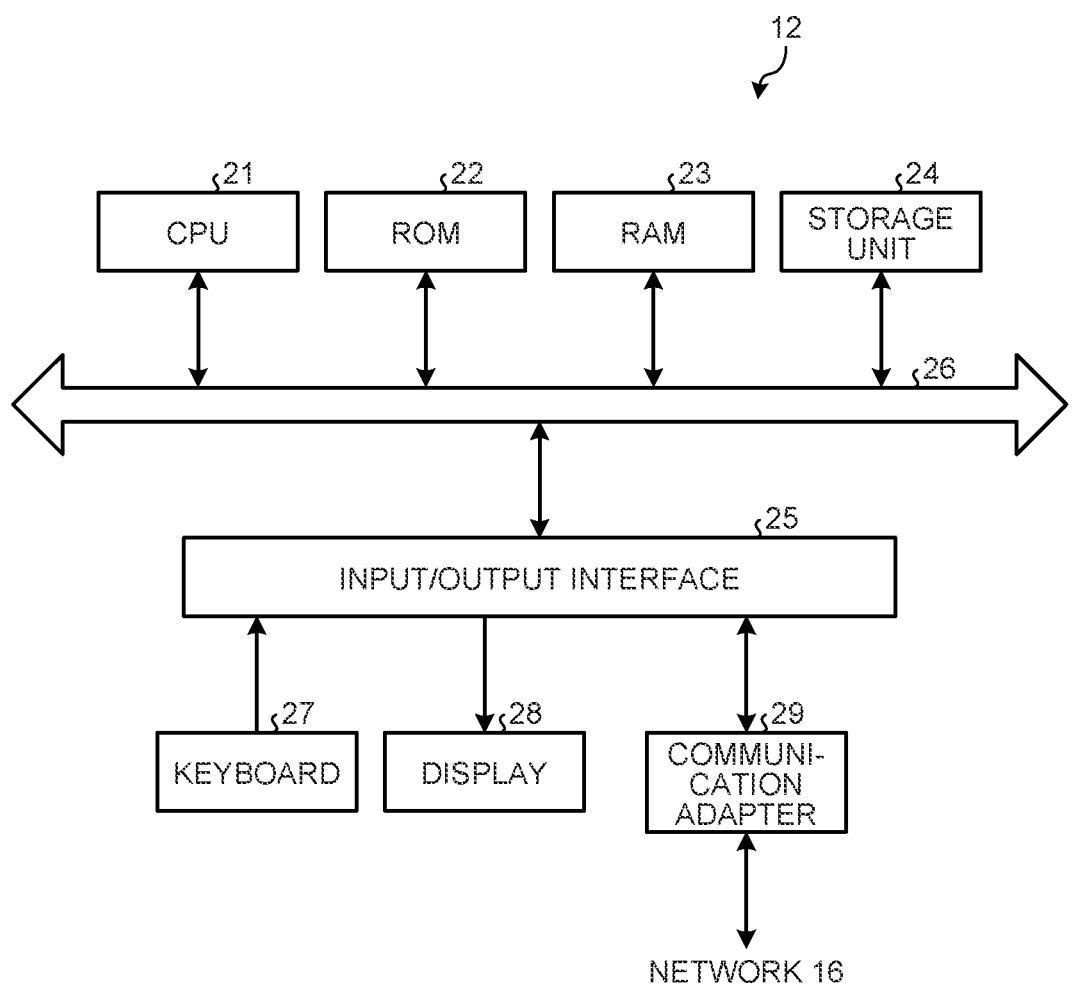
FIG. 3 is a hardware block diagram illustrating an example of a hardware configuration of a content checking device.
Figure 4:
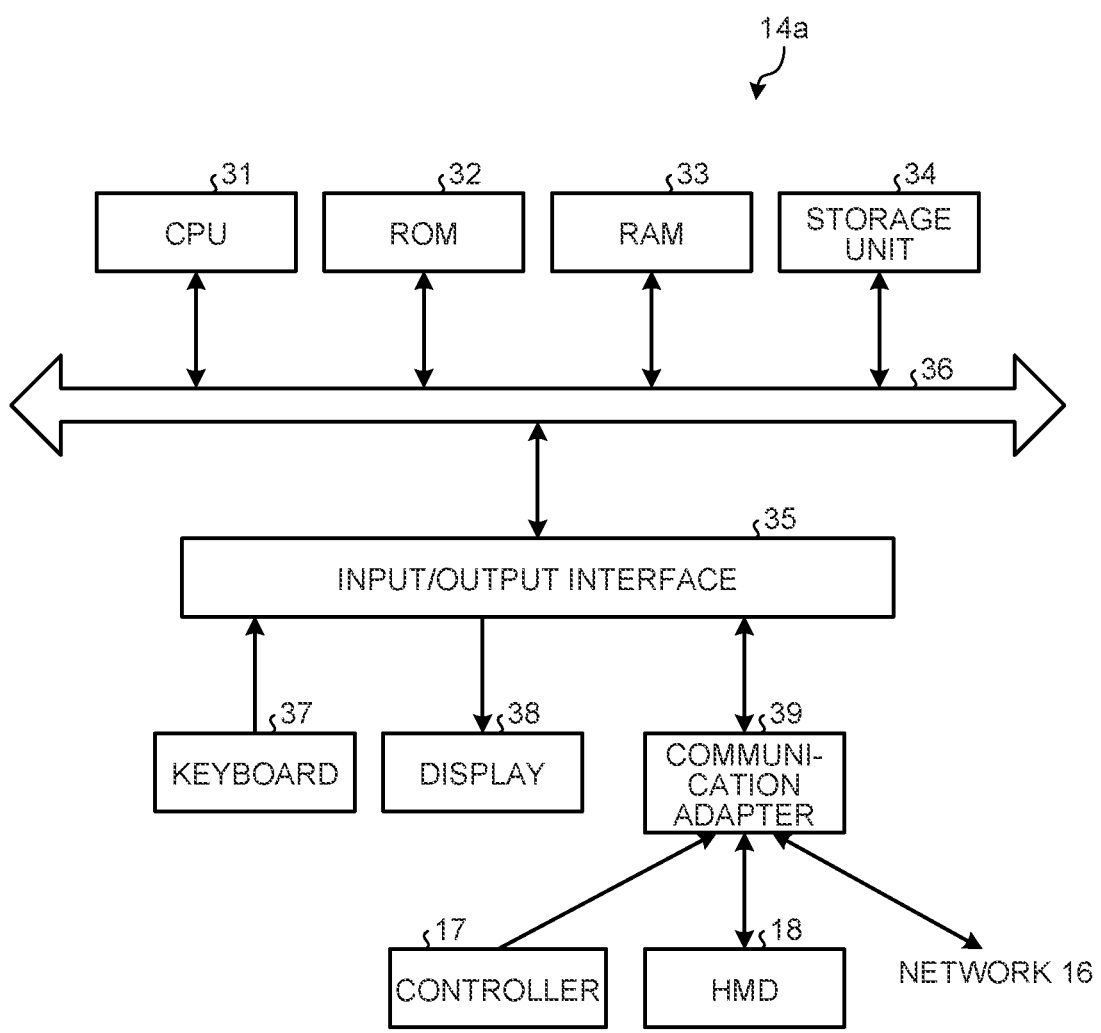
FIG. 4 is a hardware block diagram illustrating an example of a hardware configuration of a virtual space generation device.

Next, a hardware configuration of the virtual exhibition system 10*a* will be described with reference to FIGS. 3 and 4. FIG. 3 is a hardware block diagram illustrating an example of a hardware configuration of the content checking device. FIG. 4 is a hardware block diagram illustrating an example of a hardware configuration of the virtual space generation device.

The content checking device 12 has a configuration in which a central processing unit (CPU) 21, a read only memory (ROM) 22, a random access memory (RAM) 23, a storage unit 24, and an input/output controller 25 are connected by an internal bus 26.

The CPU 21 controls the entire operation of the content checking device 12 by loading a control program stored in the storage unit 24 and various data files stored in the ROM 22 into the RAM 23 and executing the control program and the various data files. That is, the content checking device 12 has the configuration of a general computer that operates using a control program. Note that the control program may be provided via a wired or wireless transmission medium such as a local area network, the Internet, or digital satellite broadcasting. The content checking device 12 may execute a series of procedures by hardware. Note that the control program executed by the CPU 21 may be a program for executing procedures chronologically in the order described in the present disclosure, or may be a program for executing procedures in parallel or when necessary such as when it is called.

The storage unit 24 includes, for example, a flash memory, and stores the control program and the like executed by the CPU 21.

The input/output controller 25 connects the CPU 21 with various input/output devices to input/output information.

The input/output controller 25 is connected with a keyboard 27 that gives operation instructions to the content checking device 12 and a display 28 that displays the operating state of the content checking device 12. In addition, the input/output controller 25 is connected with a communication adapter 29 that exchanges various types of information with the virtual space generation device 14a. The communication adapter 29 connects the content checking device 12 with the virtual space generation device 14a via the network 16 (see FIG. 1).

As illustrated in FIG. 4, the virtual space generation device 14a has a configuration in which a CPU 31, a ROM 32, a RAM 33, a storage unit 34, and an input/output controller 35 are connected by an internal bus 36.

The CPU 31 controls the entire operation of the virtual space generation device 14a by loading a control program stored in the storage unit 34 and various data files stored in the ROM 32 into the RAM 33 and executing the control program and the various data files. That is, the virtual space generation device 14a has the configuration of a general computer that operates using a control program. Note that the control program may be provided via a wired or wireless transmission medium such as a local area network, the Internet, or digital satellite broadcasting. The virtual space generation device 14a may execute a series of procedures by hardware. Note that the control program executed by the CPU 31 may be a program for executing procedures chronologically in the order described in the present disclosure, or may be a program for executing procedures in parallel or when necessary such as when it is called.

The storage unit 34 includes, for example, a flash memory, and stores the control program and the like executed by the CPU 31.

The input/output controller 35 connects the CPU 31 with various input/output devices to input/output information.

The input/output controller 35 is connected with a keyboard 37 that gives operation instructions to the virtual space generation device 14a and a display 38 that displays the operating state of the virtual space generation device 14a. In addition, the input/output controller 35 is connected with a communication adapter 39 that exchanges various types of information with the content checking device 12. The communication adapter 39 connects the virtual space generation device 14a with the content checking device 12 via the network 16 (see FIG. 1). The communication adapter 39 also connects the virtual space generation device 14a with the controller 17 and the HMD 18.

[1-3. Functional Configuration of Content Checking Device]

Figure 5:
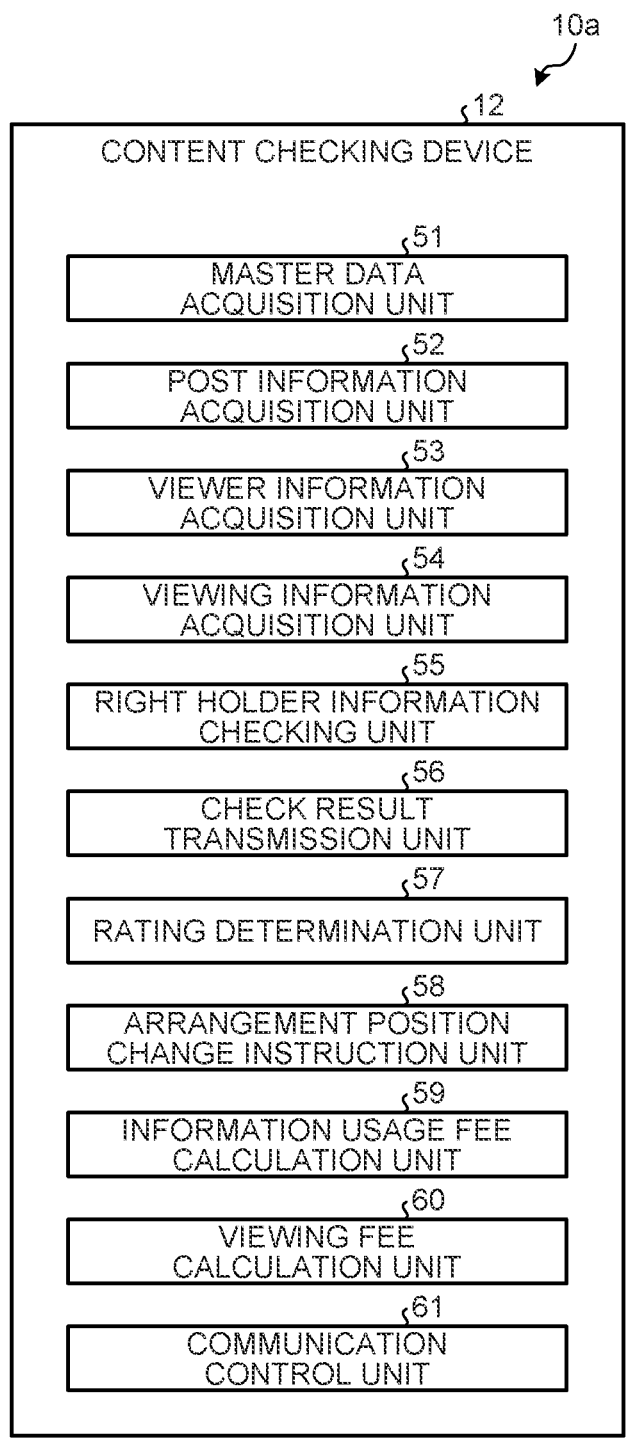
FIG. 5 is a functional block diagram illustrating an example of a functional configuration of the content checking device.

Next, a functional configuration of the content checking device 12 will be described with reference to FIG. 5. FIG. 5 is a functional block diagram illustrating an example of the functional configuration of the content checking device. The CPU 21 of the content checking device 12 included in the virtual exhibition system 10a loads the control program into the RAM 23 and runs the control program to realize the functional units illustrated in FIG. 5.

That is, the CPU 21 of the content checking device 12 realizes a master data acquisition unit 51, a post information acquisition unit 52, a viewer information acquisition unit 53, a viewing information acquisition unit 54, a right holder information checking unit 55, a check result transmission unit 56, a rating determination unit 57, an arrangement position change instruction unit 58, an information usage fee calculation unit 59, a viewing fee calculation unit 60, and a communication control unit 61 as functional units.

The master data acquisition unit 51 acquires, for example, video, image, or audio master data of the live show via the network 16. Note that these pieces of master data are provided from the right holder 42.

The post information acquisition unit 52 acquires the content 45 posted by the poster 40 from the virtual space generation device 14a.

The viewer information acquisition unit 53 acquires operation information and behavior information of the viewer 41 in the exhibition hall 44 from the virtual space generation device 14a. The operation information and the behavior information of the viewer 41 will be described later in detail.

The viewing information acquisition unit 54 acquires, from the virtual space generation device 14a, viewing information indicating that the posted content 45 has been viewed by the viewer 41.

The right holder information checking unit 55 checks the right holder information of the posted content 45. More specifically, for example, it is determined whether the posted content 45 has the right holder information, that is, is appropriate content permitted to be posted by the right holder. The right holder information checking unit 55 is an example of a checking unit of the present disclosure. Further, the right holder information checking unit 55 determines whether the posted content 45 is appropriate content, that is, for example, is not content that violates public order and morals.

Specifically, the right holder information checking unit 55 checks information on the posted content based on at least one of a video, an image, and an audio constituting the posted content 45, and supplementary information attached to the content. The supplementary information is information related to the posted content 45. It will be described in detail later. The right holder information checking unit 55 checks the information on the posted content 45 by further using the operation information and the behavior information acquired by the viewer information acquisition unit 53.

The check result transmission unit 56 transmits the check result for the posted content 45 to the virtual space generation device 14a.

The rating determination unit 57 determines the rating for the posted content 45 based on the behavior information of the viewer 41 acquired by the viewer information acquisition unit 53.

The arrangement position change instruction unit 58 outputs information instructing the virtual space generation device 14a to change the arrangement position of the content 45 posted by the poster 40 to the exhibition hall 44 (virtual space) according to the rating determined by the rating determination unit 57.

The information usage fee calculation unit 59 adds the information usage fee to be paid to the right holder 42 of the posted content 45, on condition that the content is determined to be appropriate content by the right holder information checking unit 55. More specifically, the information usage fee calculation unit 59 adds the information usage fee over a predetermined period such as week-by-week or month-by-month.

The viewing fee calculation unit 60 adds a viewing fee to be paid to the poster 40 who has posted the content 45 based on the viewing information acquired by the viewing information acquisition unit 54. More specifically, the viewing fee calculation unit 60 adds the viewing fee over a predetermined period such as week-by-week or month-by-month. Note that the viewing fee calculation unit 60 may add a higher viewing fee for content 45 posted by a poster 40 who has a high rating.

The communication control unit 61 controls communication between the content checking device 12 and the virtual space generation device 14a.

[1-4. Functional Configuration of Virtual Space Generation Device]

Figure 6:
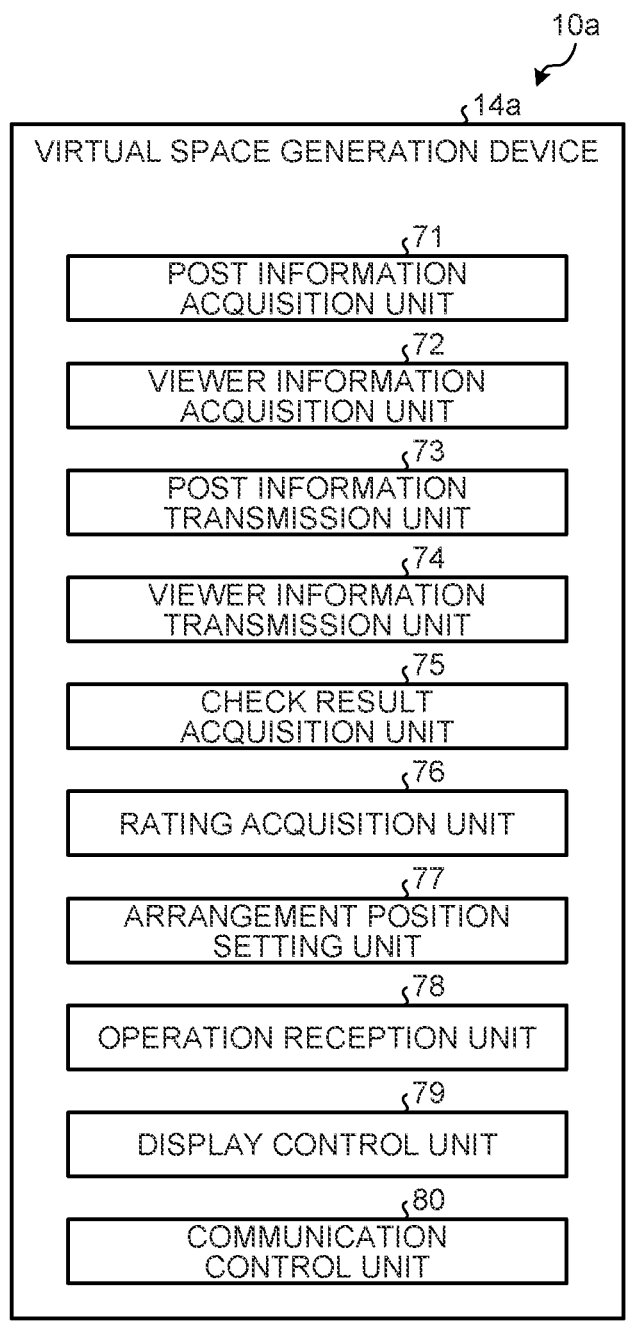
FIG. 6 is a functional block diagram illustrating an example of a functional configuration of the virtual space generation device.

Next, a functional configuration of the virtual space generation device 14a will be described with reference to FIG. 6. FIG. 6 is a functional block diagram illustrating an example of the functional configuration of the virtual space generation device. The CPU 31 of the virtual space generation device 14a included in the virtual exhibition system 10a loads the control program into the RAM 33 and runs the control program to realize the functional units illustrated in FIG. 6.

That is, the CPU 31 of the virtual space generation device 14a realizes a post information acquisition unit 71, a viewer information acquisition unit 72, a post information transmission unit 73, a viewer information transmission unit 74, a check result acquisition unit 75, a rating acquisition unit 76, an arrangement position setting unit 77, an operation reception unit 78, a display control unit 79, and a communication control unit 80 as functional units.

The post information acquisition unit 71 acquires the content 45 posted by the poster 40.

The viewer information acquisition unit 72 acquires the operation information and the behavior information of the viewer 41 viewing the exhibition hall 44. The operation information is, for example, operation information of the controller 17. The behavior information is, for example, information related to the direction of the HMD 18. The direction of the HMD 18 indicates the direction in which the viewer 41 is looking.

The post information transmission unit 73 transmits the content 45 posted by the poster 40 to the content checking device 12.

The viewer information transmission unit 74 transmits the operation information and the behavior information of the viewer 41 to the content checking device 12.

The check result acquisition unit 75 acquires, from the content checking device 12, the check result for the posted content 45, that is, information indicating that the posted content has the right holder information.

The rating acquisition unit 76 acquires a rating result for the content 45 from the content checking device 12.

The arrangement position setting unit 77 sets the arrangement position of the content 45 in the exhibition hall 44 (virtual space), on condition that the right holder information checking unit 55 has checked the right holder information of the posted content 45.

The operation reception unit 78 acquires operation information of each of the poster 40 and the viewer 41 from the controller 17 and the HMD 18.

The display control unit 79 controls how the content 45 is displayed by the HMD 18 of each of the poster 40 and the viewer 41 based on the operation information of the poster 40 and the viewer 41.

The communication control unit 80 controls communication between the virtual space generation device 14a and the content checking device 12. The communication control unit 80 also controls communication between the virtual space generation device 14a and the poster 40 and the viewer 41.

[1-5. Flow of Process Performed by Virtual Exhibition System (When Content is Posted)]

Figure 7:
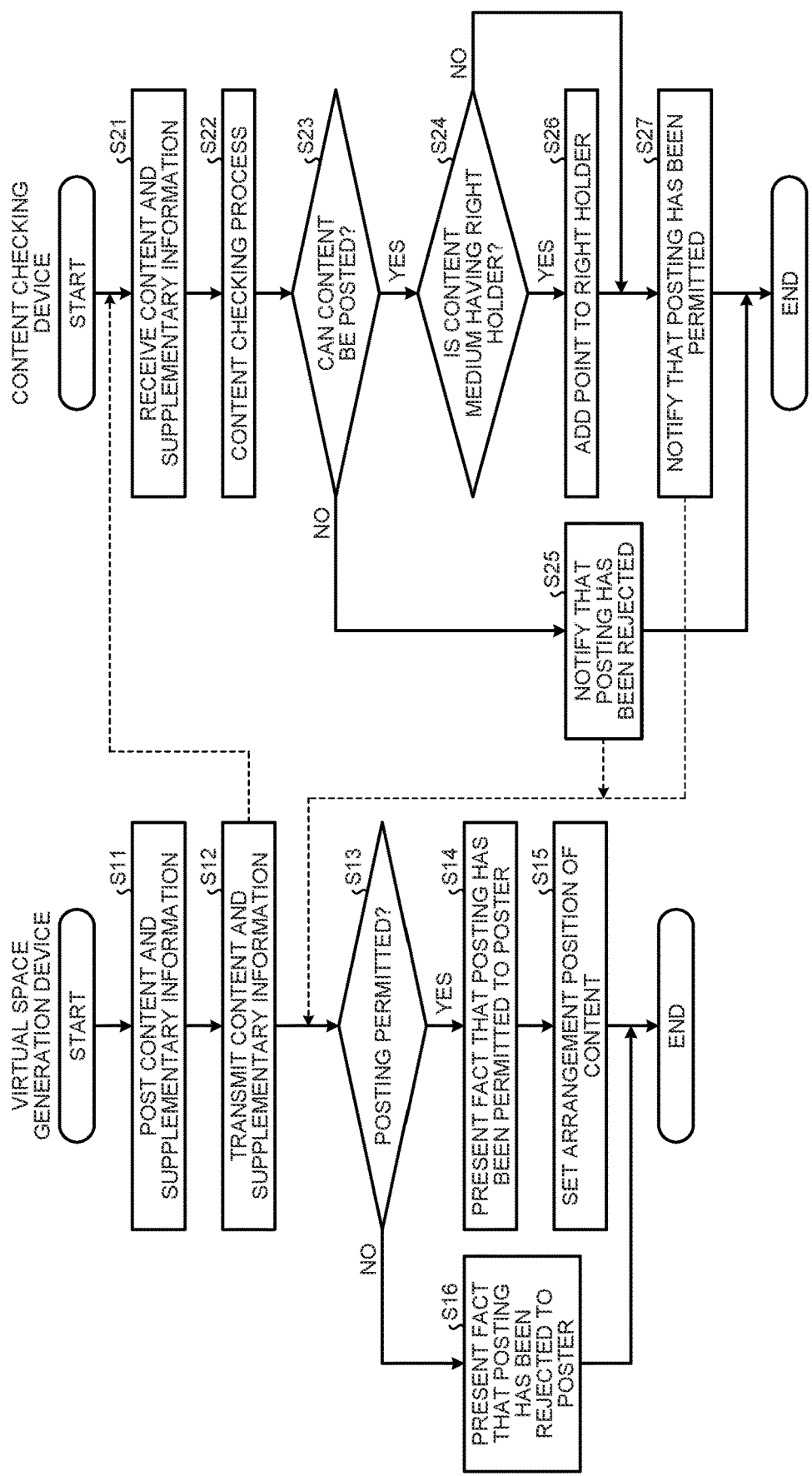
FIG. 7 is a flowchart illustrating an example of the flow of a process performed by the virtual exhibition system when a poster has posted content.

Next, the flow of a process performed by the virtual exhibition system 10a when the poster 40 has posted new content 45 will be described with reference to FIG. 7. FIG. 7 is a flowchart illustrating an example of the flow of the process performed by the virtual exhibition system when the poster has posted content.

First, the flow of a process performed by the virtual space generation device 14a will be described. The post information acquisition unit 71 acquires the content 45 posted by the poster 40 and the supplementary information (Step S11). Specifically, the supplementary information is information related to the content 45 such as the recording date and time, the recording location (latitude and longitude), and the source of the content 45. The supplementary information includes at least one of these pieces of information. These pieces of supplementary information are automatically added when the poster 40 films the video of the live show. The poster 40 may also add, for example, the name of the artist, the name of the live show, the name of the venue, and the like as the supplementary information. Note that the supplementary information may be added to content 45 posted by another poster 40. The poster 40 may post original content 45 created by himself/herself. In this case, the poster 40 registers information indicating that the content is his/her original content as supplementary information, and the poster 40 himself/herself becomes the right holder 42.

The post information transmission unit 73 transmits the posted content 45 and the supplementary information to the content checking device 12 (Step S12).

The check result acquisition unit 75 determines whether the posting has been permitted based on information on the possibility of the posting transmitted from the content checking device 12 (Step S13). When it is determined that the posting has been permitted (Step S13: Yes), the process proceeds to Step S14. On the other hand, when it is not determined that the posting has been permitted (Step S13: No), the process proceeds to Step S16. Note that content permitted to be posted is appropriate content that can be posted, and it does not matter whether or not it is content having the right holder.

When it is determined to be Yes in Step S13, the display control unit 79 causes the HMD 18 of the poster 40 to display information indicating that the posting has been permitted (Step S14).

Then, the arrangement position setting unit 77 sets the arrangement position of the posted content 45 in the exhibition hall 44 (Step S15). After that, the virtual space generation device 14a ends the process of FIG. 7.

On the other hand, when it is determined to be No in Step S13, the display control unit 79 causes the HMD 18 of the poster 40 to display information indicating that the posting has been rejected, that is, information indicating that it is not appropriate content (Step S16). After that, the virtual space generation device 14a ends the process of FIG. 7. Note that, according to the process of FIG. 7, even content not having the right holder information can be posted in the virtual space. However, measures may be taken to, for example, delete content 45 that does not have the right holder information.

Next, a flow of a process performed by the content checking device 12 will be described. The post information acquisition unit 52 receives the posted content 45 and the supplementary information from the virtual space generation device 14a (Step S21).

The right holder information checking unit 55 performs a checking process in which the content 45 received in Step S21 is checked against the master data (Step S22). Specifically, it is checked whether the master data registered in the content checking device 12 includes content matching the content 45 received in Step S21.

Based on the result of the checking process performed in Step S22, the right holder information checking unit 55 first determines whether the content is content that can be posted, that is, appropriate content (Step S23). When it is determined to be content that can be posted (Step S23: Yes), the process proceeds to Step S24. On the other hand, when it is not determined to be content that can be posted (Step S23: No), the process proceeds to Step S25.

When it is determined to be Yes in Step S23, the right holder information checking unit 55 further determines whether the posted content is a medium having the right holder (Step S24). When it is determined that the content is a medium having the right holder, that is, appropriate content permitted to be posted by the right holder (Step S24: Yes), the process proceeds to Step S26. When it is not determined that the content is a medium having the right holder, that is, appropriate content permitted to be posted by the right holder (Step S24: No), the process proceeds to Step S27. Note that whether or not the posted content is a medium having the right holder is determined based on, for example, whether or not the supplementary information of the content 45 includes the source of the content 45 or the like.

When it is determined to be Yes in Step S24, the information usage fee calculation unit 59 adds the information usage fee to be paid to the right holder 42 of the posted content 45 (Step S26). After that, the process proceeds to Step S27.

Following Step S26, or when it is determined to be No in Step S24, the check result transmission unit 56 notifies the virtual space generation device 14a that the posting of the content has been permitted (Step S27). That is, the virtual space generation device 14a is notified that the posted content has been determined to be appropriate content regardless of the presence/absence of the right holder information. Then, the content checking device 12 ends the process of FIG. 7.

Returning to Step S23, when it is determined to be No in Step S23, the check result transmission unit 56 notifies the virtual space generation device 14a that the posting has been rejected because the content is not appropriate (Step S25). Then, the content checking device 12 ends the process of FIG. 7.

[1-6. Flow of Process Performed by Virtual Exhibition System (When Content is Viewed)]

Figure 8:
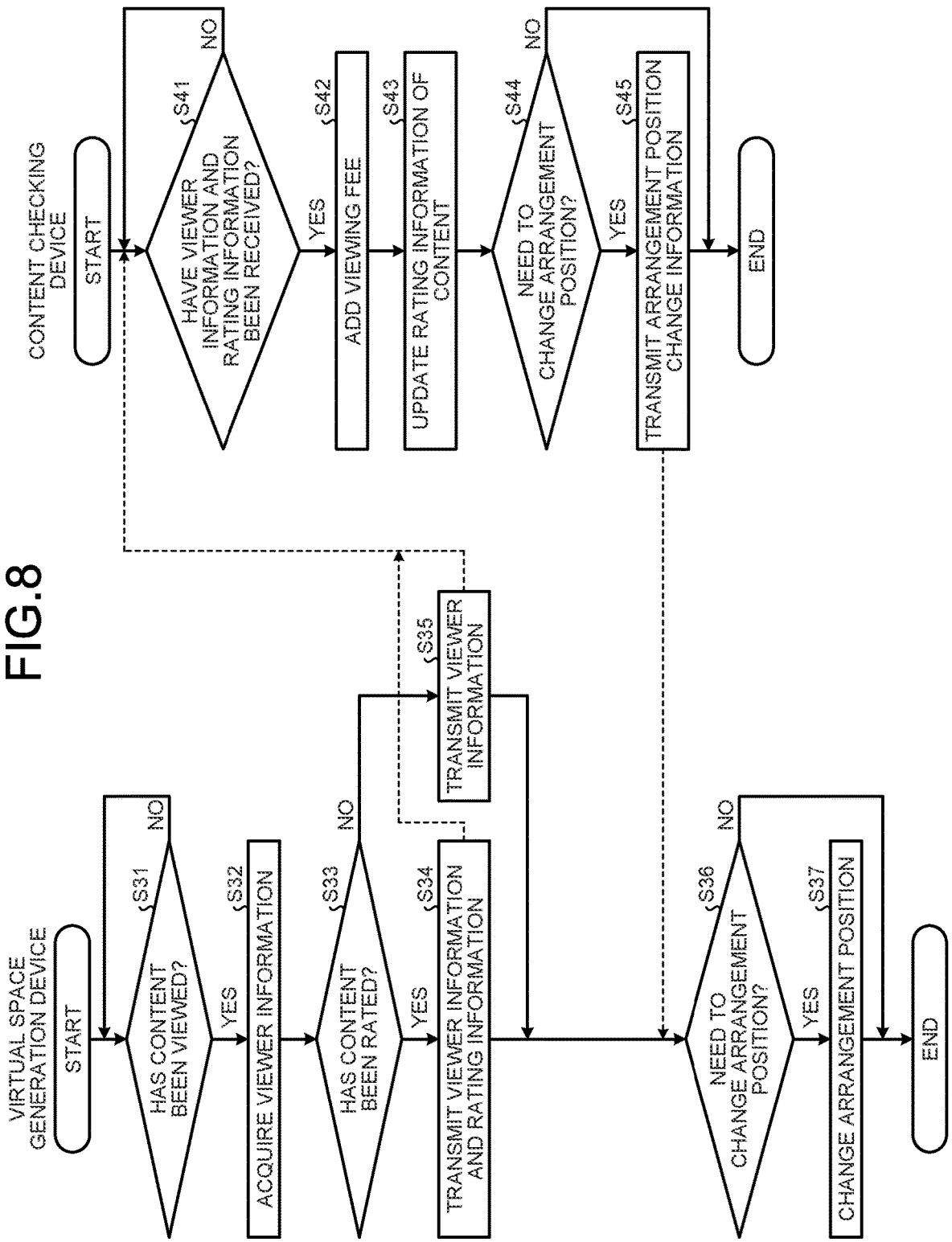
FIG. 8 is a flowchart illustrating an example of the flow of a process performed by the virtual exhibition system when a viewer has viewed content.

Next, a flow of a process performed by the virtual exhibition system 10a when the viewer 41 has viewed the content 45 will be described with reference to FIG. 8. FIG. 8 is a flowchart illustrating an example of the flow of the process performed by the virtual exhibition system when the viewer has viewed content.

First, the flow of a process performed by the virtual space generation device 14a will be described. The viewer information acquisition unit 72 determines whether the viewer 41 has viewed the content 45 (Step S31). When it is determined that the viewer 41 has viewed the content 45 (Step S31: Yes), the process proceeds to Step S32. On the other hand, when it is not determined that the viewer 41 has viewed the content 45 (Step S31: No), Step S31 is repeated. Note that whether the viewer 41 is viewing the content 45 and the content 45 being viewed are determined based on, for example, the operation information of the controller 17 that is used by the viewer 41 to select the content 45 to be viewed. This operation information is acquired by the viewer information acquisition unit 53.

When it is determined to be Yes in Step S31, the viewer information acquisition unit 72 acquires the operation information and the behavior information of the viewer 41 (Step S32).

The viewer information acquisition unit 72 determines whether the viewer 41 has rated the content 45 he/she has viewed (Step S33). When it is determined that the viewer 41 has rated the content 45 he/she has viewed (Step S33: Yes), the process proceeds to Step S34. On the other hand, when it is not determined that the viewer 41 has rated the content 45 he/she has viewed (Step S33: No), the process proceeds to Step S35. Note that whether the viewer 41 has rated the content 45 he/she has viewed is determined based on the operation information of the controller 17.

When it is determined to be Yes in Step S33, the viewer information transmission unit 74 transmits viewer information acquired by the viewer information acquisition unit 72 and rating information of the viewed content 45 to the content checking device 12 (Step S34). After that, the process proceeds to Step S36.

On the other hand, when it is determined to be No in Step S33, the viewer information transmission unit 74 transmits the viewer information acquired by the viewer information acquisition unit 72 to the content checking device 12 (Step S35). After that, the process proceeds to Step S36.

Following Step S34 or Step S35, the arrangement position setting unit 77 determines whether it is necessary to change the arrangement position of the content 45 viewed by the viewer 41 based on arrangement position change information acquired from the content checking device 12 (Step S36). When it is determined that the arrangement position needs to be changed (Step S36: Yes), the process proceeds to Step S37. On the other hand, when it is not determined that the arrangement position needs to be changed (Step S36: No), the virtual space generation device 14a ends the process of FIG. 8.

When it is determined to be Yes in Step S36, the arrangement position setting unit 77 changes the arrangement position of the content 45 viewed by the viewer 41 to the position indicated by the content checking device 12. After that, the virtual space generation device 14a ends the process of FIG. 8.

Next, a flow of a process performed by the content checking device 12 will be described. The viewer information acquisition unit 53 determines whether the viewer information and the rating information have been received from the virtual space generation device 14a (Step S41). When it is determined that the viewer information and the rating information have been received (Step S41: Yes), the process proceeds to Step S42. On the other hand, when it is not determined that the viewer information and the rating information have been received (Step S41: No), Step S41 is repeated. Note that since the rating information is transmitted only when the viewer 41 performs rating, in some cases, the rating information is not transmitted.

When it is determined to be Yes in Step S41, the viewing fee calculation unit 60 adds the viewing fee for the viewer 41 (Step S42).

Subsequently, the rating determination unit 57 updates the rating of the content 45 that has been viewed by the viewer 41 (Step S43).

The arrangement position change instruction unit 58 determines whether it is necessary to change the arrangement position of the content 45 viewed by the viewer 41 based on the rating result of the content 45 (Step S44). When it is determined that the arrangement position of the content 45 viewed by the viewer 41 needs to be changed (Step S44: Yes), the process proceeds to Step S45. On the other hand, when it is not determined that the arrangement position of the content 45 viewed by the viewer 41 needs to be changed (Step S44: No), the content checking device 12 ends the process of FIG. 8.

When it is determined to be Yes in Step S44, the arrangement position change instruction unit 58 transmits, to the virtual space generation device 14a, an instruction to change the arrangement position of the content 45 viewed by the viewer 41 (Step S45). Then, the content checking device 12 ends the process of FIG. 8. The arrangement position change instruction unit 58 issues an instruction to place content 45 having a higher rating at an arrangement position that is more noticeable to the viewer 41. The arrangement position change instruction unit 58 issues an instruction to place content 45 having a lower rating at an arrangement position that is less noticeable to the viewer 41.

[1-7. Effects of First Embodiment]

As described above, in the content checking device 12 (information processing device) of the first embodiment, the right holder information checking unit 55 (checking unit) checks whether the content 45 posted by the poster 40 to the virtual space in which one or more pieces of content can be shared has the right holder information indicating that the content is appropriate content permitted to be posted by the right holder of the content 45.

Since only appropriate content having the right holder information can be posted, posted content can be appropriately handled. In addition, the information usage fee to be paid to the right holder 42 of the posted content 45 can be appropriately calculated.

Further, in the content checking device 12 (information processing device) of the first embodiment, the right holder information checking unit 55 (checking unit) determines whether or not the content 45 is content that can be posted based on at least one of the video, image, and audio constituting the posted content 45, and the supplementary information attached to the content 45.

As a result, it is possible to accurately determine whether the content 45 is appropriate.

In addition, in the content checking device 12 (information processing device) of the first embodiment, the supplementary information of the posted content 45 includes at least one of the recording date and time, the recording location, and the source of the content 45.

As a result, it is possible to determine whether the content 45 is appropriate even more accurately.

Further, in the content checking device 12 (information processing device) of the first embodiment, the right holder information checking unit 55 (checking unit) determines whether or not the posted content 45 is content that can be posted by further using the operation information and the behavior information acquired by the viewer information acquisition unit 53.

Since the viewer 41 can determine whether or not the content 45 posted by the poster 40 is appropriate, the determination accuracy can be improved. Further, since what the content 45 contains and the check result at this time are stored in the content checking device 12, the content checking device 12 can perform so-called machine learning to improve the checking accuracy of the content checking device 12.

In the content checking device 12 (information processing device) of the first embodiment, the viewing information acquisition unit 54 acquires the viewing information indicating that the posted content 45 has been viewed, and the viewing fee calculation unit 60 adds the viewing fee to be paid to the poster 40 who has posted the content 45 based on the viewing information.

This makes it possible to calculate the viewing fee easily and reliably. Since the content checking device 12 can also acquire information on the viewing time from the virtual space generation device 14a, it is also possible to calculate the viewing fee according to the viewing time.

Furthermore, in the content checking device 12 (information processing device) of the first embodiment, the rating determination unit 57 determines the rating for the content 45 posted by the poster 40 based on the behavior information of the viewer 41 acquired by the viewer information acquisition unit 53.

This makes it possible to, for example, give a high rating to content 45 that has attracted attention based on the line-of-sight behavior of the viewer 41.

The content checking device 12 (information processing device) of the first embodiment identifies the content 45 being viewed by the viewer 41 based on the behavior information of the viewer 41 (for example, the time his/her eyes had been fixed or the like) acquired by the viewer information acquisition unit 53.

This allows the content checking device 12 to identify the content 45 the viewer 41 is paying attention to without him/her giving a special instruction or the like.

In the content checking device 12 (information processing device) of the first embodiment, the viewing fee calculation unit 60 adds a higher viewing fee for a poster 40 who is highly rated.

This makes it possible to set the viewing fee according to the rating of the poster 40, which in turn makes it possible to motivate the poster 40 to post content 45.

In the content checking device 12 (information processing device) of the first embodiment, the arrangement position change instruction unit 58 instructs a virtual space generation device 14 to change the arrangement position of the content 45 posted by the poster 40 to the exhibition hall 44 (virtual space) based on the rating from the rating determination unit 57.

Since the arrangement position of the content 45 can be updated as necessary, the freshness of the posted content 45 can be maintained.

In the virtual space generation device 14a (information processing device) of the first embodiment, the post information acquisition unit 71 acquires the content 45 posted by the poster 40, and the arrangement position setting unit 77 sets the arrangement position of the content 45 in the exhibition hall 44 generated in the virtual space on condition that the posted content 45 is content that can be posted.

As a result, the content 45 posted by the poster 40 can be placed in the exhibition hall 44 generated in the virtual space when it is content that can be posted.

In the virtual space generation device 14a (information processing device) of the first embodiment, the post information transmission unit 73 transmits the content 45 to the content checking device 12.

This makes it possible to determine whether the content 45 posted by the poster 40 is content that can be posted outside the virtual space generation device 14a. This improves the degree of freedom in building the virtual exhibition system 10a.

2. Second Embodiment

[2-1. Functional Configuration of Virtual Space Generation Device of Second Embodiment]

A virtual exhibition system 10b of a second embodiment is the virtual exhibition system 10a (see FIG. 1) described in relation to the first embodiment plus a function of replacing content 45 posted by another poster 40 with content 45 posted by a poster 40.

That is, the virtual exhibition system 10*b* of the second embodiment has a configuration in which the content checking device 12 and a virtual space generation device 14*b* are connected by the network 16. The hardware configuration of the virtual space generation device 14*b* is the same as the hardware configuration of the virtual space generation device 14*a* (see FIG. 4). Note that the virtual space generation device 14*b* is an example of the information processing device of the present disclosure.

Figure 9:
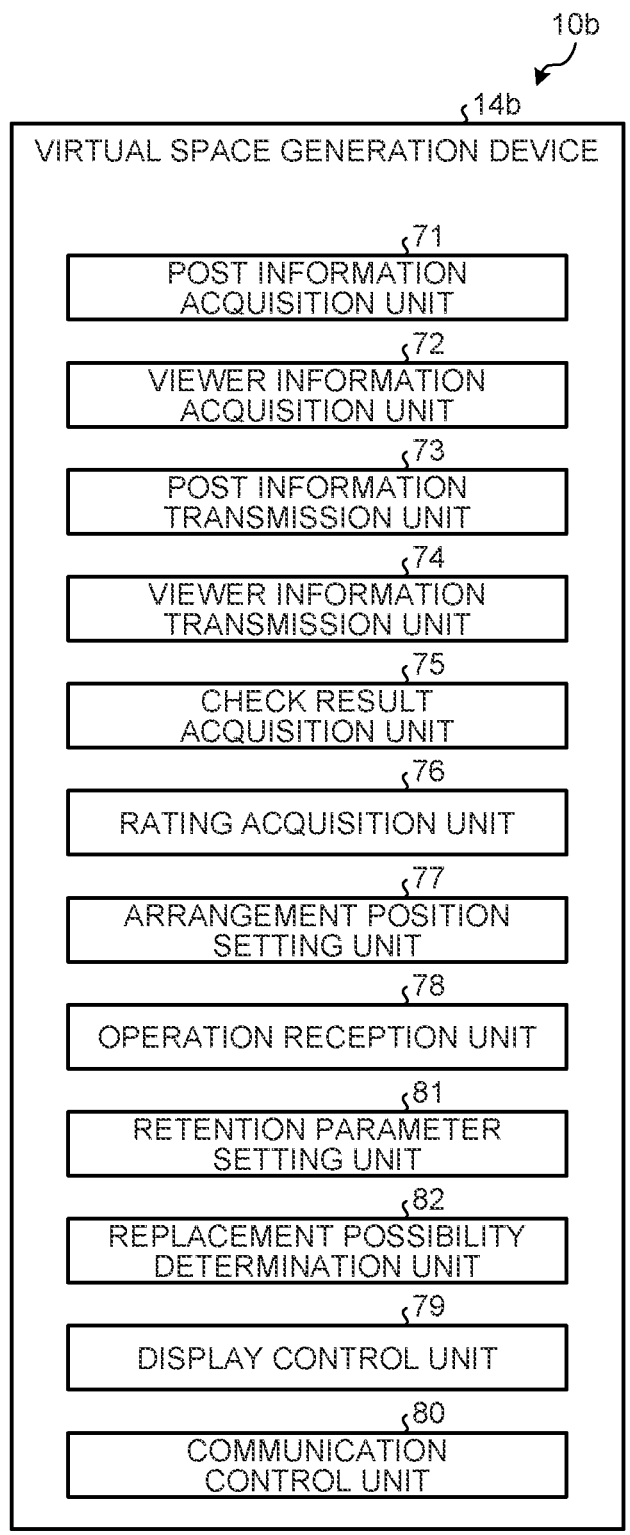
FIG. 9 is a functional block diagram illustrating an example of a functional configuration of a virtual space generation device included in a virtual exhibition system of a second embodiment.

Next, a functional configuration of the virtual space generation device 14*b* included in the virtual exhibition system 10*b* of the second embodiment will be described with reference to FIG. 9. FIG. 9 is a functional block diagram illustrating an example of the functional configuration of the virtual space generation device included in the virtual exhibition system of the second embodiment.

The virtual space generation device 14*b* includes a retention parameter setting unit 81 and a replacement possibility determination unit 82 in addition to the functional configuration of the virtual space generation device 14*a* (see FIG. 6).

The retention parameter setting unit 81 sets a retention parameter 90 for the posted content 45. The retention parameter 90 is a parameter representing the ability to retain the content 45 placed in the exhibition hall 44 so that it will still be placed in the exhibition hall 44, that is, retention power. A method of setting the retention parameter 90 will be described later (see FIG. 10).

The replacement possibility determination unit 82 determines whether content 45 posted in the exhibition hall 44 can be replaced when the poster 40 posts content 45. Specifically, the ability to replace the content 45 placed in the exhibition hall 44 by the content 45 posted by the poster himself/herself, that is, a replacement parameter 91 is set for the poster 40, and the set replacement parameter 91 is compared with the retention parameter 90 of the content 45 placed in the exhibition hall 44 to determine whether replacement is possible. This will be described in detail later (see FIG. 10).

[2-2. Retention Parameter and Replacement Parameter of Content]

Figure 10:
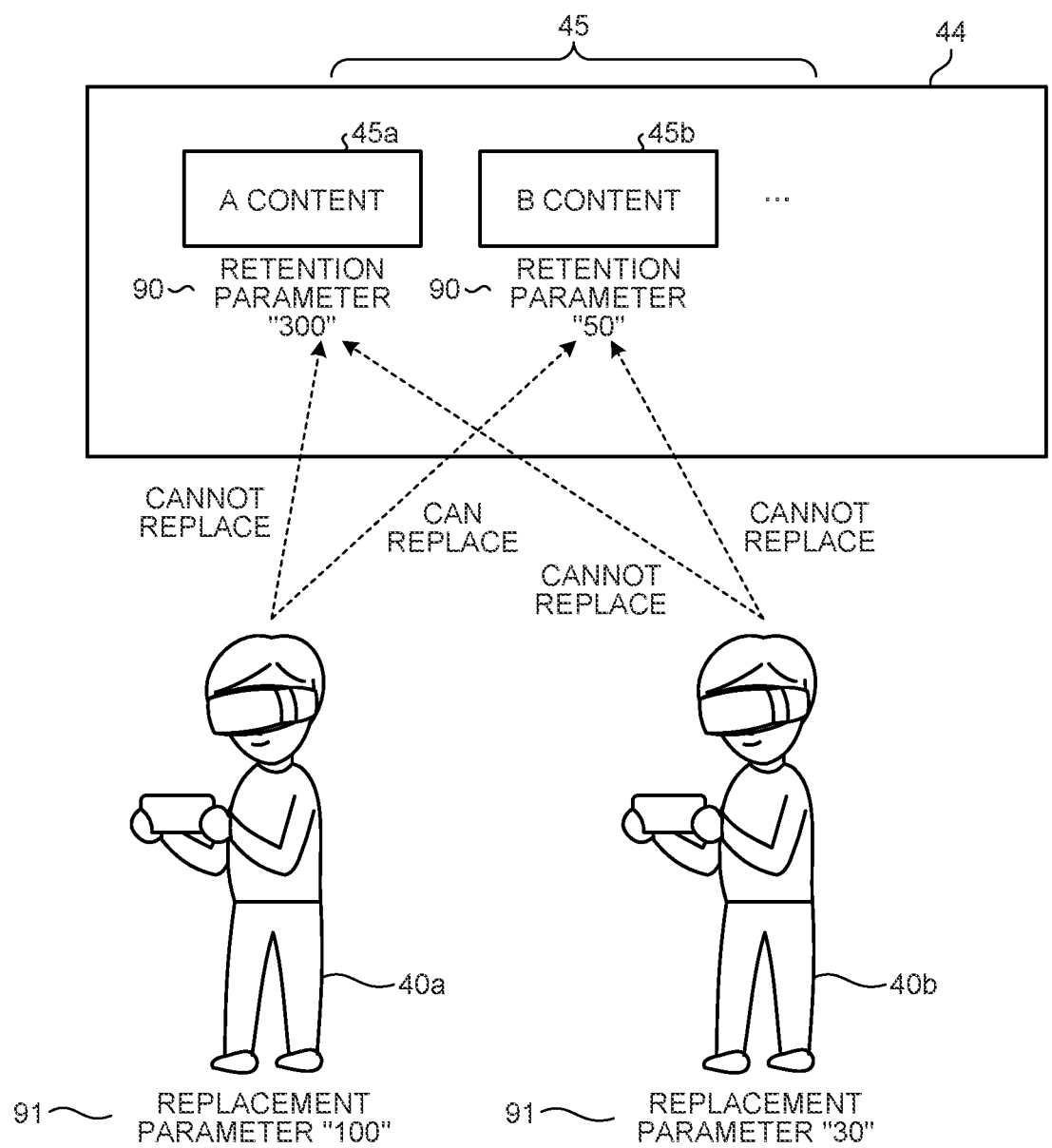
FIG. 10 is a diagram for explaining a content replacement process.

Next, the functions of the retention parameter 90 and the replacement parameter 91 will be described with reference to FIG. 10. FIG. 10 is a diagram for explaining a content replacement process.

As illustrated in FIG. 10, it is assumed that two pieces of content 45 (A content 45*a* and B content 45*b*) are placed in the exhibition hall 44. The retention parameter setting unit 81 sets the retention parameter 90 for each content. The retention parameter 90 is a positive numerical value, and the larger the value is, the higher the retention power to retain the placed content 45 is.

The retention parameter setting unit 81 sets the retention parameter 90 based on the state (quality) of the posted content 45. For example, the retention parameter setting unit 81 analyzes the posted content 45 to, for example, determine whether the main subject appears large and clear, whether there is little noise in the video and/or audio, whether similar content 45 is already placed, and the like. Then, based on these analysis results, a retention parameter 90 is set to the posted content 45. A high retention parameter may be set for content 45 posted by a poster 40 who has posted content many times.

Further, the retention parameter setting unit 81 may set the retention parameter 90 based on the rating of the posted content 45. For example, the retention parameter setting unit 81 may set the retention parameter 90 so that the larger the rating result for the content 45 acquired by the rating acquisition unit 76 is, the higher the value of the retention parameter 90 is. The retention parameter 90 may be set to a large value for a poster 40 who has viewed content many times, that is, a poster 40 who has paid a large information usage fee to the right holder 42.

On the other hand, a replacement parameter 91 is set for the poster 40 in advance. The replacement parameter 91 has a positive numerical value, and the larger the value is, the higher the replacement power to replace content 45 that is already there is. The replacement parameter 91 is set according to, for example, the number of posts of the poster 40, the ratings of the pieces of content 45 posted by the poster 40, and the like.

For example, in FIG. 10, "300" is set as the retention parameter 90 for the A content 45*a* placed in the exhibition hall 44. "50" is set as the retention parameter 90 for the B content 45*b*.

It is assumed that a poster 40*a* and a poster 40*b* each post new content 45. "100" is set as the replacement parameter 91 for the poster 40*a*. "30" is set as the replacement parameter 91 for the poster 40*b*.

Each of the posters 40*a* and 40*b* can either simply post the content 45 or specify one of the pieces of content 45 that are already placed and replace the specified content 45 with the content 45 posted by himself/herself.

FIG. 10 illustrates a state in which each of the posters 40*a* and 40*b* is attempting to replace the A content 45*a* or B content 45*b* that is already posted with the content 45 posted by himself/herself.

Since the replacement parameter 91 of the poster 40*a* is set to "100", the replacement possibility determination unit 82 determines that content 45 with a retention parameter 90 smaller than "100" can be replaced with the content 45 posted by the poster 40*a*. On the other hand, the replacement possibility determination unit 82 determines that content 45 with a retention parameter 90 larger than "100" cannot be replaced by the content 45 posted by the poster 40*a*. Therefore, in the case of the example of FIG. 10, the content 45 posted by the poster 40*a* can replace the B content 45*b*. On the other hand, the content 45 posted by the poster 40*a* cannot replace the A content 45*a*.

Since the replacement parameter 91 of the poster 40*b* is set to "30", the content 45 posted by the poster 40*b* cannot replace either the A content 45*a* or the B content 45*b*.

Note that the replacement parameter 91 of the poster 40 is set based on various determination criteria. That is, as described above, the larger the number of times the poster 40 has posted content, the larger the value of the replacement parameter 91 for the poster 40 is. Further, the higher the rating given by the viewer 41 to the content 45 posted by the poster 40 is, the larger the value of the replacement parameter 91 for the poster 40 is. The replacement parameter 91 of the poster 40 may be set to a large value when the poster 40 makes a payment.

[2-3. Effects of Second Embodiment]

As described above, according to the virtual space generation device 14*b* (information processing device) of the second embodiment, the retention parameter setting unit 81 sets, for the content 45 posted in the exhibition hall 44 (virtual space), the retention parameter 90 for keeping the content 45 posted. Then, the replacement possibility determination unit 82 determines whether or not content 45 already posted in the exhibition hall 44 can be replaced with the content 45 posted by the poster 40 based on the replacement parameter 91 set for the poster 40 and the retention parameter 90 set for the content 45 posted in the exhibition hall 44.

Since this makes it possible to replace content 45 already posted, the quality of the posted pieces of content 45 can be continuously improved.

Further, according to the virtual space generation device 14b (information processing device) of the second embodiment, the replacement possibility determination unit 82 determines that content 45 that is already posted in the exhibition hall 44 can be replaced with the content 45 posted by the poster 40, on condition that the replacement power to replace the content 45, which is determined by the replacement parameter 91 of the content 45 posted by the poster 40, is larger than the retention power to retain the content 45, which is determined by the retention parameter 90 of the content 45 already posted to the exhibition hall 44.

This makes it possible to replace the content 45 using a simple determination criterion.

According to the virtual space generation device 14b (information processing device) of the second embodiment, the retention parameter 90 is set based on the state of the posted content 45 or the rating of the viewer 41 for the posted content 45.

This makes it possible to set the retention parameter 90 of the posted content 45 based on a fair rating criterion.

According to the virtual space generation device 14b (information processing device) of the second embodiment, the replacement parameter 91 is set based on the number of times the poster 40 has posted content or the rating of the viewer 41 for the content 45 posted by the poster 40.

This makes it possible to set the replacement parameter 91 of the poster 40 based on a fair rating criterion.

3. Third Embodiment

[3-1. System Configuration of Virtual Exhibition System of Third Embodiment]

According to the virtual exhibition system 10a described in relation to the first embodiment and the virtual exhibition system 10b described in relation to the second embodiment, the poster 40 can post only the content 45 that is based on video data, image data, and/or audio data captured by the poster himself/herself. Meanwhile, in the third embodiment, the poster 40 can freely edit various data acquired at the live venue and post the edited version.

Figure 11:
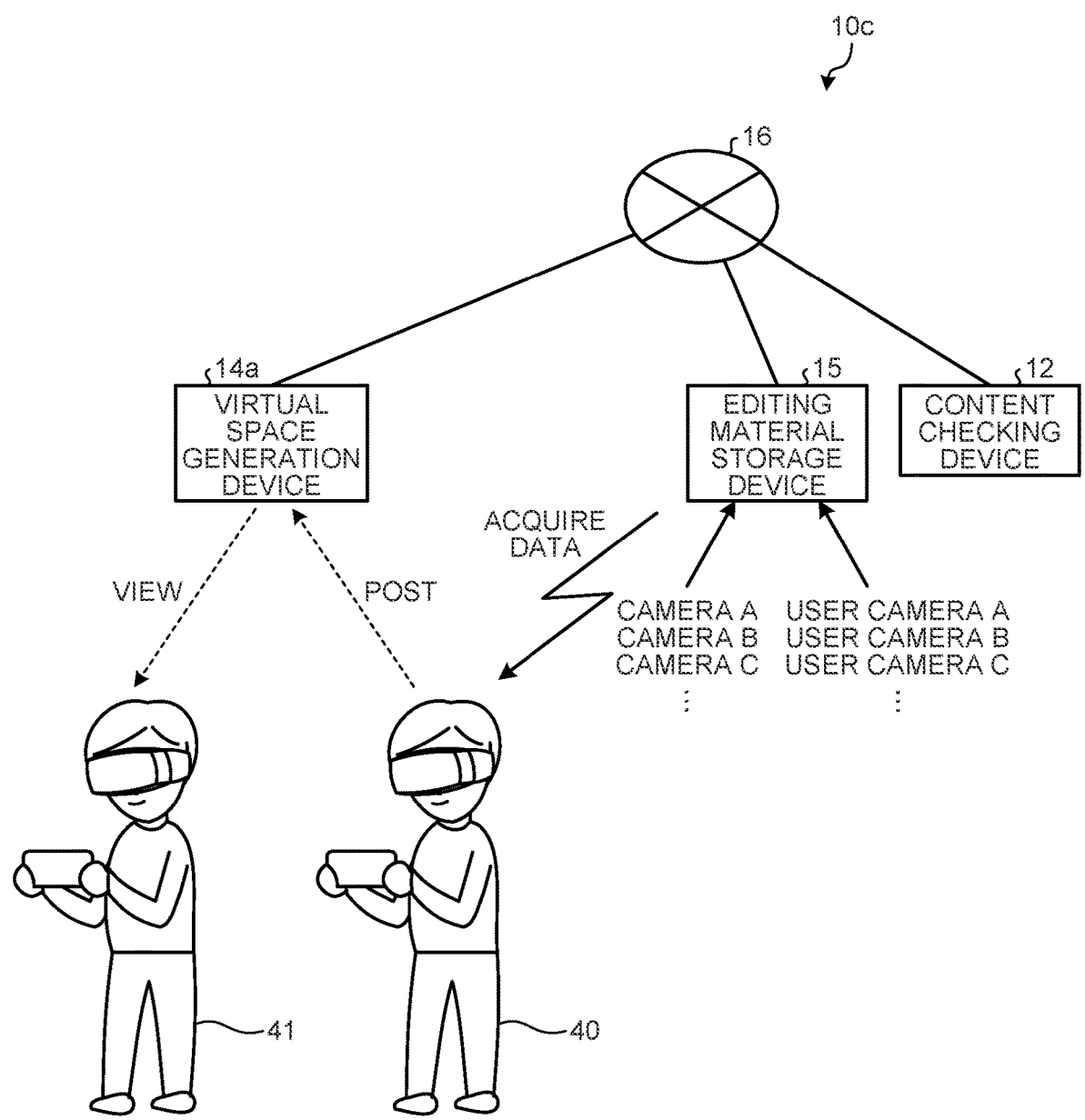
FIG. 11 is a system block diagram illustrating an example of a general configuration of a virtual exhibition system according to a third embodiment.

FIG. 11 is a system block diagram illustrating an example of a general configuration of the virtual exhibition system according to the third embodiment. As illustrated in FIG. 11, a virtual exhibition system 10c of the third embodiment has a configuration in which an editing material storage device 15 is added to the virtual exhibition system 10a (see FIG. 1) described in relation to the first embodiment.

The editing material storage device 15 is, for example, a device that stores master data related to an artist's live show. The master data is, for example, video data provided by a plurality of cameras (camera A, camera B, camera C, . . . ) that filmed the live venue, video data which a user attending the live show has filmed using his/her own portable terminal or camera (user camera A, user camera B, user camera C, . . . ), or the like. Note that the editing material storage device 15 is an example of a server device of the present disclosure.

The post information acquisition unit 71 (see FIG. 6) included in the virtual space generation device 14a acquires information obtained by the poster 40 editing material data which is a material of the content 45 and is stored in the editing material storage device 15 (server device).

Note that a time code is attached to the video data obtained by the plurality of cameras (camera A, camera B, camera C, . . . ) stored in the editing material storage device 15 so that videos of the cameras can be easily combined (can be easily synchronized). The poster 40 downloads the video data obtained by the plurality of cameras to a terminal device (not illustrated) such as a personal computer owned by the poster, and then freely edits each video.

Note that, other than using a time code, video editing may be performed by using a voice/speech recognition function that runs on the terminal device of the poster 40 to recognize the voice/speech of the live show, and editing the video filmed by different cameras based on the voice of the live performer such as the singing voice or talking voice.

The poster 40 may upload a material to the editing material storage device 15 by himself/herself. Further, content 45 to which effects have been added by the poster 40 may be uploaded to the editing material storage device 15. Materials uploaded in these ways are shared among users.

[3-2. Effects of Third Embodiment]

As described above, according to the virtual space generation device 14a (information processing device) of the third embodiment, the post information acquisition unit 71 acquires information obtained by editing material data which is a material of the content 45 and stored in the editing material storage device 15 (server device).

As a result, the quality of the content 45 posted by the poster 40 can be further improved.

Although the present disclosure has been described using some embodiments, these embodiments may be implemented in a suitable device. In that case, the device can be configured to have required functional blocks and obtain required information.

In addition, for example, the steps of one flowchart may be executed by one device, or may be distributed among a plurality of devices and executed by them. In a case where one step includes a plurality of procedures, the plurality of procedures may be executed by one device, or may be distributed among a plurality of devices and executed by them. In other words, the plurality of procedures included in one step can also be executed as the procedures of a plurality of steps. Conversely, procedures described as a plurality of steps can be executed collectively as one step.

Further, for example, a program executed by the computer may be executed in such a way that the procedures of the steps describing the program are executed chronologically in the order described herein, executed in parallel, or executed individually when it is needed such as when it is called. That is, as long as there is no contradiction, the procedures of the steps may be executed in an order different from that described above. Furthermore, the procedures of the steps describing the program may be executed in parallel with the procedures of another program, or may be executed in combination with the procedures of another program.

In addition, for example, a plurality of techniques related to a technique of the present disclosure can be each implemented independently as a single technique as long as there is no contradiction. Needless to say, a plurality of techniques of the present disclosure can be applied and implemented. For example, part or all of the technique of the present disclosure described in relation to one embodiment can be implemented in combination with part or all of the technique of the present disclosure described in relation to another embodiment. Furthermore, part or all of any one of the above-described techniques of the present disclosure can be implemented in combination with another technique that is not described above.

Note that the effects described herein are merely non-exclusive examples, and other effects may be provided. The embodiments of the present disclosure are not limited to the above-described embodiments, and various modifications can be made without departing from the gist of the present disclosure.

For example, the present disclosure can be configured as follows.

(1)

An information processing device including a checking unit that checks information on content posted by a poster in a virtual space in which one or more pieces of content can be shared,
- wherein the checking unit checks whether the posted content has right holder information.

(2)

The information processing device according to (1),
- wherein the checking unit
- checks the information on the content based on at least one of a video, an image, and an audio constituting the posted content, and supplementary information attached to the content.

(3)

The information processing device according to (1) or (2),
- wherein the supplementary information
- includes at least one of a recording date and time, a recording location, and a source of the content.

(4)

The information processing device according to any one of (1) to (3), further including
- a viewer information acquisition unit that acquires operation information and behavior information of a viewer of the content posted in the virtual space,
- wherein the checking unit checks the information on the posted content by further using the operation information and the behavior information acquired by the viewer information acquisition unit.

(5)

The information processing device according to any one of (1) to (4), further including
- a viewing information acquisition unit that acquires viewing information indicating that the posted content has been viewed, and
- a viewing fee calculation unit that adds a viewing fee to be paid to the poster who has posted the content based on the viewing information acquired by the viewing information acquisition unit.

(6)

The information processing device according to (4) or (5), further including
- a rating determination unit that determines a rating for the content posted by the poster based on the behavior information of the viewer acquired by the viewer information acquisition unit.

(7)

The information processing device according to any one of (4) to (6),
- wherein the information processing device identifies the content being viewed by the viewer based on the behavior information of the viewer acquired by the viewer information acquisition unit.

(8)

The information processing device according to any one of (5) to (7),
- wherein the viewing fee calculation unit
- adds a higher viewing fee for content posted by a poster who has a high rating.

(9)

The information processing device according to any one of (6) to (8), further including
- an arrangement position change instruction unit that issues an instruction to change an arrangement position of the content posted by the poster in the virtual space based on the rating from the rating determination unit.

(10)

The information processing device according to any one of (1) to (9), further including
- a post information acquisition unit that acquires the content posted by the poster in the virtual space, and
- an arrangement position setting unit that sets an arrangement position of the content in the virtual space on condition that the checking unit has checked the information on the content.

(11)

The information processing device according to any one of (1) to (10), further including
- a post information transmission unit that transmits the content to the checking unit.

(12)

The information processing device according to any one of (1) to (11), further including
- a retention parameter setting unit that sets, for content posted in the virtual space, a retention parameter for keeping the content posted, and
- a replacement possibility determination unit that determines whether content already posted in the virtual space can be replaced with the content posted by the poster based on a replacement parameter set for the poster and the retention parameter set for the content posted in the virtual space.

(13)

The information processing device according to (12),
- wherein the replacement possibility determination unit
- determines that the content already posted in the virtual space can be replaced with the content posted by the poster on condition that replacement power to replace the content, which is determined by the replacement parameter, is larger than retention power to retain the content, which is determined by the retention parameter.

(14)

The information processing device according to (12) or (13),
- wherein the retention parameter
- is set based on a state of the posted content or a rating of the viewer for the posted content.

(15)

The information processing device according to any one of (12) to (14),
- wherein the replacement parameter
- is set based on a number of times the poster has posted content or a rating of the viewer for the content posted by the poster.

(16)

The information processing device according to any one of (10) to (15),
- wherein the post information acquisition unit acquires information obtained by editing material data which is a material of the content and is stored in a server device.

(17)

An information processing system including:
- a virtual space generation device that acquires content posted by a poster in a virtual space, and places the content in the virtual space on condition that the content has right holder information; and a content checking device that checks information on the content posted in the virtual space.

(18) A program that causes a computer to function as a checking unit that checks information on content posted by a poster in a virtual space in which one or more pieces of content can be shared so as to check right holder information of the posted content.

REFERENCE SIGNS LIST 10a, 10b, 10c VIRTUAL EXHIBITION SYSTEM (INFORMATION PROCESSING SYSTEM)
12 CONTENT CHECKING DEVICE (INFORMATION PROCESSING DEVICE)
14a, 14b VIRTUAL SPACE GENERATION DEVICE (INFORMATION PROCESSING DEVICE)
15 EDITING MATERIAL STORAGE DEVICE (SERVER DEVICE)
16 NETWORK
17 CONTROLLER
18 HMD
40 POSTER
41 VIEWER
42 RIGHT HOLDER
43 OPERATING COMPANY
44 EXHIBITION HALL (VIRTUAL SPACE)
45 CONTENT
51 MASTER DATA ACQUISITION UNIT
52, 71 POST INFORMATION ACQUISITION UNIT
53, 72 VIEWER INFORMATION ACQUISITION UNIT
54 VIEWING INFORMATION ACQUISITION UNIT
55 RIGHT HOLDER INFORMATION CHECKING UNIT (CHECKING UNIT)
56 CHECK RESULT TRANSMISSION UNIT
57 RATING DETERMINATION UNIT
58 ARRANGEMENT POSITION CHANGE INSTRUCTION UNIT
59 INFORMATION USAGE FEE CALCULATION UNIT
60 VIEWING FEE CALCULATION UNIT
61, 80 COMMUNICATION CONTROL UNIT
73 POST INFORMATION TRANSMISSION UNIT
74 VIEWER INFORMATION TRANSMISSION UNIT
75 CHECK RESULT ACQUISITION UNIT
76 RATING ACQUISITION UNIT
77 ARRANGEMENT POSITION SETTING UNIT
78 OPERATION RECEPTION UNIT
79 DISPLAY CONTROL UNIT
81 RETENTION PARAMETER SETTING UNIT
82 REPLACEMENT POSSIBILITY DETERMINATION UNIT
90 RETENTION PARAMETER
91 REPLACEMENT PARAMETER

The invention claimed is:

1. An information processing device including a checking unit configured to check information on content posted by a poster in a virtual space in which one or more pieces of content can be shared, a retention parameter setting unit configured to set, for content posted in the virtual space, a retention parameter for keeping the content posted, and a replacement possibility determination unit configured to determine whether content already posted in the virtual space can be replaced with the content posted by the poster based on the retention parameter set for the content posted in the virtual space, wherein the checking unit checks whether the posted content has right holder information, and wherein the checking unit, the retention parameter setting unit, and the replacement possibility determination unit are each implemented via at least one processor.

2. The information processing device according to claim 1, wherein the checking unit is further configured to check the information on the content based on at least one of a video, an image, and an audio constituting the posted content, and supplementary information attached to the content.

3. The information processing device according to claim 2, wherein the supplementary information includes at least one of a recording date and time, a recording location, or a source of the content.

4. The information processing device according to claim 1, further including a viewer information acquisition unit configured to acquire operation information and behavior information of a viewer of the content posted in the virtual space, wherein the checking unit is further configured to check the information on the posted content by further using the operation information and the behavior information acquired by the viewer information acquisition unit, and wherein the viewer information acquisition unit is implemented via at least one processor.

5. The information processing device according to claim 4, further including a rating determination unit configured to determine a rating for the content posted by the poster based on the behavior information of the viewer acquired by the viewer information acquisition unit, wherein the rating determination unit is implemented via at least one processor.

6. The information processing device according to claim 5, further including an arrangement position change instruction unit configured to issue an instruction to change an arrangement position of the content posted by the poster in the virtual space based on the rating from the rating determination unit, wherein the arrangement position change instruction unit is implemented via at least one processor.

7. The information processing device according to claim 4, wherein the information processing device identifies the content being viewed by the viewer based on the behavior information of the viewer acquired by the viewer information acquisition unit.

8. The information processing device according to claim 1, further including a viewing information acquisition unit configured to acquire viewing information indicating that the posted content has been viewed, and a viewing fee calculation unit configured to add a viewing fee to be paid to the poster who has posted the content based on the viewing information acquired by the viewing information acquisition unit, wherein the viewing information acquisition unit and the viewing fee calculation unit are each implemented via at least one processor.

9. The information processing device according to claim 8,
wherein the viewing fee calculation unit is further configured to add a higher viewing fee for content posted by a poster who has a high rating.

10. The information processing device according to claim 1, further including
a post information acquisition unit configured to acquire the content posted by the poster in the virtual space, and
an arrangement position setting unit configured to set an arrangement position of the content in the virtual space on condition that the checking unit has checked the information on the content,
wherein the post information acquisition unit and the arrangement position setting unit are each implemented via at least one processor.

11. The information processing device according to claim 10,
wherein the post information acquisition unit is further configured to acquire information obtained by editing material data which is a material of the content and is stored in a server device.

12. The information processing device according to claim 1, further including
a post information transmission unit configured to transmit the content to the checking unit,
wherein the post information transmission unit is implemented via at least one processor.

13. The information processing device according to claim 1,
wherein the replacement possibility determination unit is further configured to determine whether the content already posted in the virtual space can be replaced with the content posted by the poster based on a replacement parameter set for the poster.

14. The information processing device according to claim 13,
wherein the replacement possibility determination unit is further configured to determine that the content already posted in the virtual space can be replaced with the content posted by the poster on condition that replacement power to replace the content, which is determined by the replacement parameter, is larger than retention power to retain the content, which is determined by the retention parameter.

15. The information processing device according to claim 13,
wherein the retention parameter is set based on a state of the posted content or a rating of a viewer for the posted content.

16. The information processing device according to claim 13,
wherein the replacement parameter is set based on a number of times the poster has posted content or a rating of the viewer for the content posted by the poster.

17. An information processing system including:
a virtual space generation device configured to acquire content posted by a poster in a virtual space, and places the content in the virtual space on condition that the content has right holder information; and
a content checking device configured to check information on the content posted in the virtual space,
wherein the virtual space generation device is further configured to
set, for content posted in the virtual space, a retention parameter for keeping the content posted, and
determine whether content already posted in the virtual space can be replaced with the content posted by the poster based on the retention parameter set for the content posted in the virtual space, and
wherein the virtual space generation device and the content checking device are each implemented via at least one processor.

18. A non-transitory computer-readable medium having embodied thereon a program, which when executed by a computer causes the computer to execute an information processing method, the method comprising:
checking information on content posted by a poster in a virtual space in which one or more pieces of content can be shared so as to check right holder information of the posted content;
setting, for content posted in the virtual space, a retention parameter for keeping the content posted; and
determining whether content already posted in the virtual space can be replaced with the content posted by the poster based on the retention parameter set for the content posted in the virtual space.

* * * * *